United States Patent

Stengel

[11] 3,992,808
[45] Nov. 23, 1976

[54] MUSHROOM TRAY

[76] Inventor: Paul G. Stengel, R.D. No. 2, Kennett Square, Pa. 19348

[22] Filed: Dec. 31, 1975

[21] Appl. No.: 645,558

[52] U.S. Cl. .................................. 47/1.1; 217/69; 108/158; 34/238
[51] Int. Cl.² ............................................. A01G 1/04
[58] Field of Search ............ 47/1.1, 34, 18; 34/238; 108/158; 217/42, 65, 69

[56] References Cited

UNITED STATES PATENTS

| 737,607 | 9/1903 | Gunby | 34/238 |
|---|---|---|---|
| 1,152,366 | 8/1915 | Backus | 217/69 |
| 1,252,234 | 1/1918 | Camp | 217/69 |
| 1,337,005 | 4/1920 | Drumm | 34/238 |
| 2,540,254 | 2/1951 | Garber | 108/158 |
| 3,118,249 | 1/1964 | Bard et al. | 47/1.1 |
| 3,342,364 | 9/1967 | Bingham et al. | 217/69 |
| 3,485,405 | 12/1969 | Dement | 217/65 |
| 3,842,534 | 10/1974 | Walters et al. | 47/1.1 |

FOREIGN PATENTS OR APPLICATIONS

| 1,534,107 | 7/1968 | France | 217/42 |

*Primary Examiner*—Robert E. Bagwill
*Attorney, Agent, or Firm*—Louis V. Schiavo

[57] ABSTRACT

A rectangular wooden tray having a pair of opposed side panels, a pair of opposed end panels, and a bottom is carried by four wooden legs tied together by a system of cross bracing overlying the bottom of the tray.

5 Claims, 7 Drawing Figures

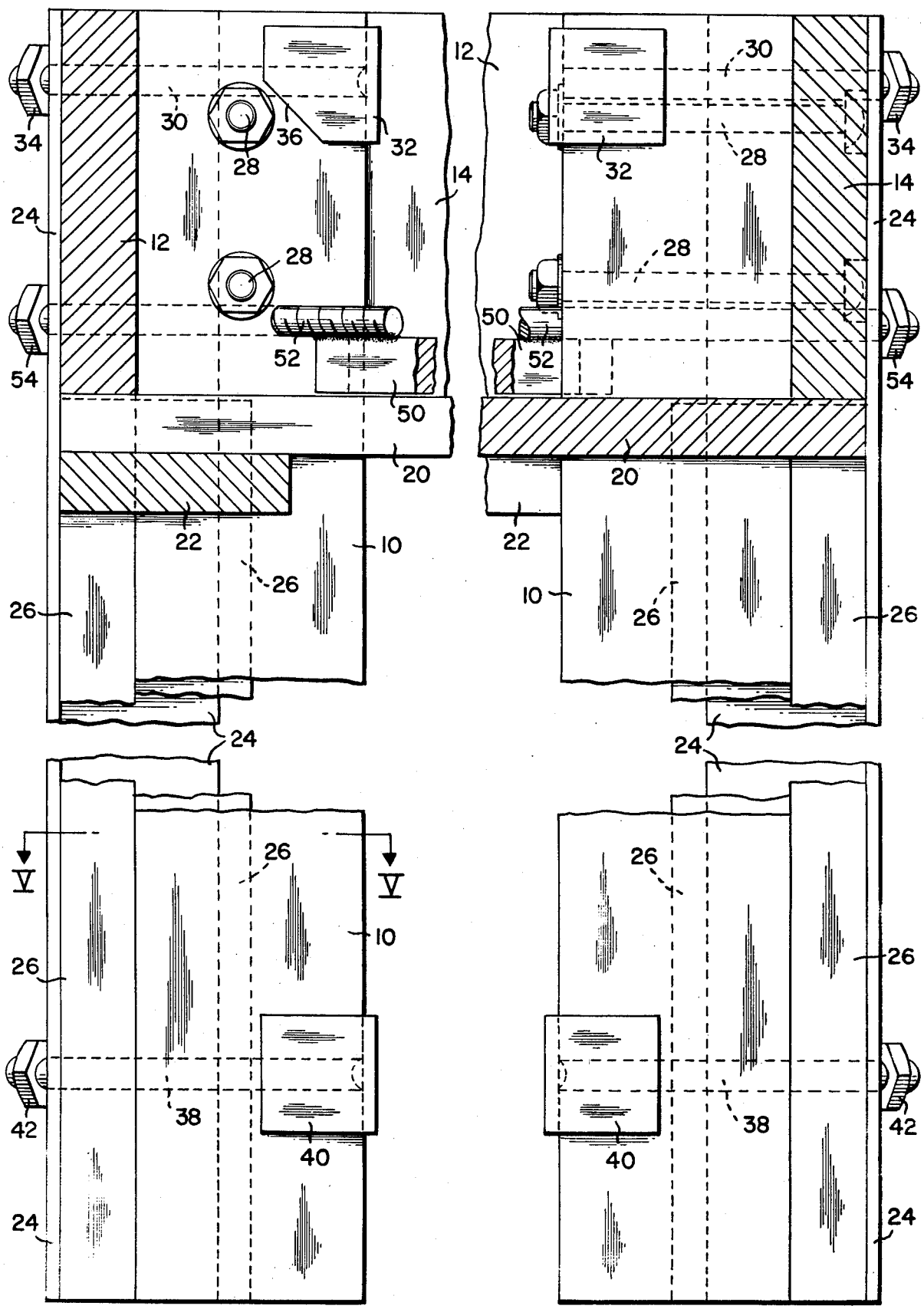

MUSHROOM TRAY

BACKGROUND OF THE INVENTION

1. Field of the Invention

The present invention relates to trays for compost used in the cultivation of mushrooms.

2. Description of the Prior Art

The growth of mushrooms takes place in several stages requiring different ambient conditions. In the first stage, the trays are filled with raw compost and then placed in a pasteurization room and held at an elevated temperature for a number of days. In the second stage, the trays are dumped and then refilled with the pasteurized compost to which spawn has been added, and then placed in a room which has closely controlled humidity conditions for a number of days for the growth of mushrooms.

The mushrooms may be picked from the trays in the growing room which is dark and humid or the trays may be moved out of the growing room, picked and then restacked in the growing room.

As can be readily understood, the growth of mushrooms at a large mushroom farm requires the use of thousands of trays in which the compost is pasteurized at high temperatures, the room system is germinated under controlled conditions and the mushrooms are grown under controlled humidity and temperature conditions. These trays must be stackable in close relationship, in order to accommodate the greatest possible number within the enclosed areas, and the trays must be strong enough to withstand the strain of being transported by fork-lifts and conveyor belts and/or rollers from one area to another.

The cost of wooden mushroom trays has increased substantially in recent years and such wooden trays have a useful life of only about three years, on the average, so that their cost per year is fairly high. Wood deteriorates rapidly under the varying conditions of use so that wooden trays break under the strain of transportation or under the weight of stacking. Wood also expands to a substantial degree when moved from a dry atmosphere to a wet atmosphere, and in some instances, where stacks of wooden trays are placed in touching relation, the expansion of the wooden trays is sufficient to topple the outermost stacks.

SUMMARY OF THE INVENTION

The principal object of the present invention is to provide stackable wooden trays of the type commonly used in the cultivation of mushrooms with means arranged for tying the legs of such a tray together and thereby effectively bracing the same for extending the useful life of the tray.

Another object of the present invention is to provide stackable wooden trays of the type commonly used in the cultivation of mushrooms with cross bracing arranged for tying the legs of such a tray together in fixed relation.

Still another object of the present invention is to provide stackable wooden trays of the type commonly used in the cultivation of mushrooms with leg braces and with cross bracing connected to said leg braces and effectively tying the legs of such a tray together in fixed relation.

BRIEF DESCRIPTION OF THE DRAWINGS

FIGS. 3 and 4 are sections respectively on lines III—III and IV—IV in FIG. 2;

DESCRIPTION OF THE PREFERRED EMBODIMENT

Figure 1:
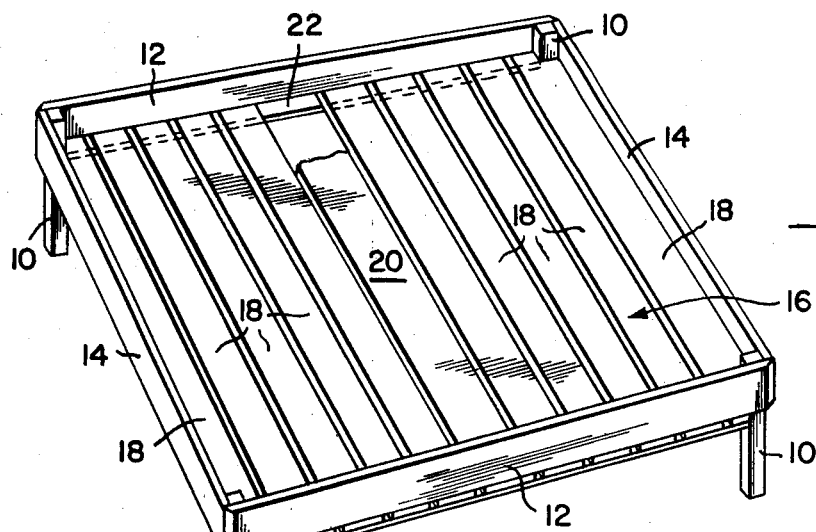
FIG. 1 is a perspective view of a wooden mushroom tray, the means to be assembled therewith for effectively bracing the same in accordance with the present invention being omitted and part of the bottom of the tray being broken away for the sake of clarity.

The following description is directed to the specific form of the invention shown in the drawings. It is not addressed to the scope of the invention, which may be practiced in a wide variety of forms.

Referring to the drawings, and particularly to FIG. 1, the tray stands upon four wooden legs 10. Extending about the upper sections of the legs 10 are a pair of opposed wooden side panels 12 and a pair of opposed wooden end panels 14 conjointly providing a rectangular enclosure 16. A plurality of laterally spaced wooden boards 18, random in width, provide a bottom 20 for the enclosure. The panels 12 and 14 are connected to the legs 10 as will appear hereinafter. At each side of the tray, the corresponding ends of the boards 18 are seated upon a wooden member 22, which is nailed to the overlying side panel 12. The boards 18 respectively at opposite ends of the tray are also nailed to the end panels 14.

The leg 10 at each corner of the tray is braced. The leg brace comprises a plate member 24 of L-shape in transverse section and of a length substantially corresponding to that of the legs 10. The upper section of the leg brace overlies the ends of the side and end panels, and the lower section overlies wooden filler members 26 interposed between the leg 10 and the leg brace, as shown. A pair of bolts 28 extend through the upper section of the leg 10 for connecting the end panel 14 to the leg. A bolt 30 extends diagonally through the upper section of the leg 10 and has welded to the inner end thereof a short clip 32 of L-shape in transverse section overlying the associated outer surfaces of the leg 10. The outer end of the bolt 30 extends through the heel of the leg brace and has threaded thereon a nut 34. When the nut is threaded on tight, the clip 32 is drawn tight against the leg 10, and the side panel 12 is clamped against the leg 10. As shown in FIG. 3, one leg of the clip 32 is cut away, as at 36, to clear the proximate bolt 28. A bolt 38 extends diagonally through the lower section of the leg 10 and has welded to the inner end thereof a short clip 40 of L-shape in transverse section overlying the associated outer surfaces of the leg 10. The outer end of the bolt 38 extends through the heel of the leg brace and has threaded thereon a nut 42. When the nut is threaded on tight, the clip 40 is drawn tight against the leg 10, and the filler members 26 are clamped against the leg 10.

Figure 6:
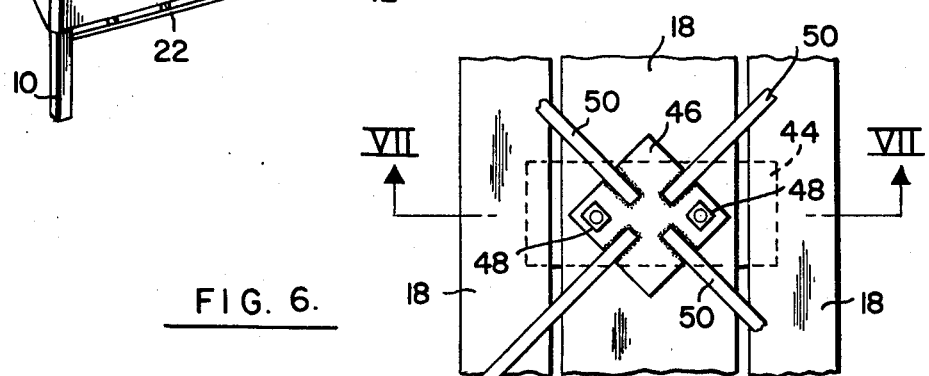
FIG. 6 is a fragmentary plan view of cross bracing for the tray shown in FIG. 1.
Figure 7:
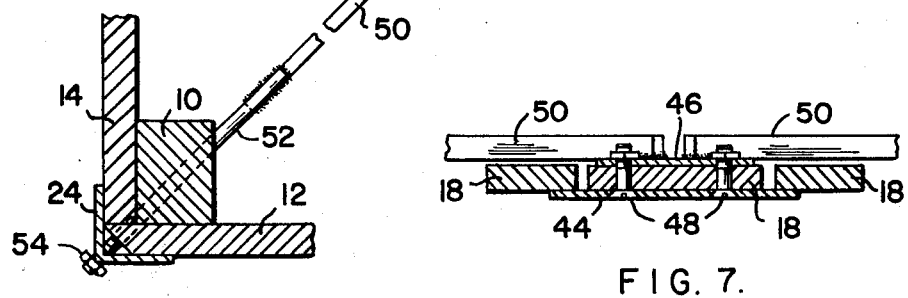
FIG. 7 is a section on lines VII—VII in FIG. 6.
Figure 2:
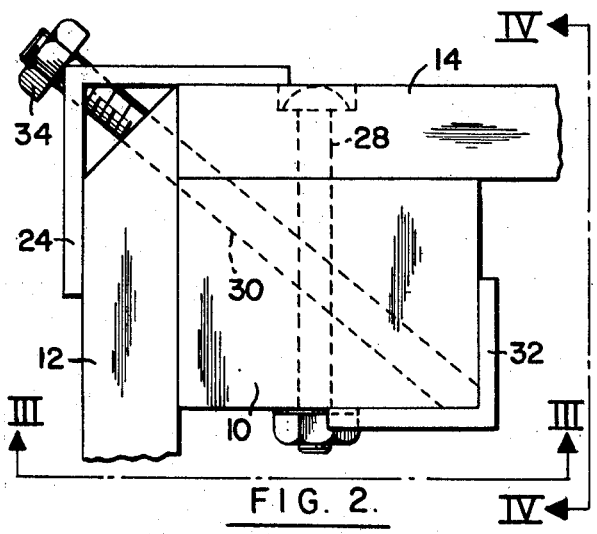
FIG. 2 is a fragmentary plan view of the tray illustrated in FIG. 1, showing only one corner of the tray.
Figure 5:
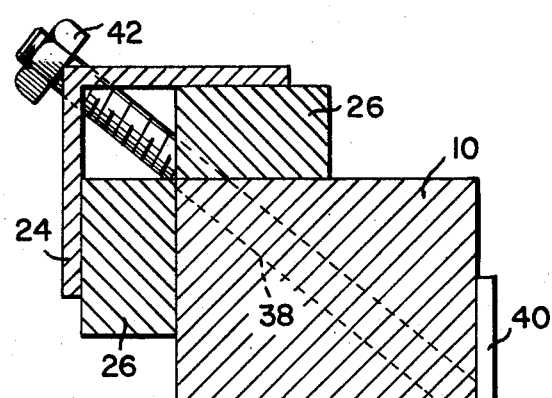
FIG. 5 is a section on line V—V in FIG. 3.

Referring particularly to FIGS. 6 and 7, the tray is provided with a system of cross bracing interconnecting the four corners thereof. The cross bracing is anchored at the center of the tray by means including a plate 44 underlying the bottom 20, a plate 46 overlying the bottom 20 and bolts 48, which secure the plates 44 and 46 to the bottom. Extending from the plate 46 in angularly spaced relation, each toward one of the legs of the tray, are four rods 50, the inner ends of which are welded to the plate 46. The outer end of each rod 50 carries a threaded member 52 secured thereto by a weldment and extending therefrom in longitudinal continuation, diagonally through the leg 10 and the head of the leg brace to carry a nut 54 drawn tight against the leg brace. Thus, the cross bracing is disposed in close overlying relation to the bottom 20.

To assemble the cross bracing with the wooden structure the plates 44 and 46 may be secured to the bottom 20 by bolts 48. Then the threaded members 52 are projected respectively through the legs 10 and the leg braces 24. Next, each rod 50 is positioned with the opposite end portions thereof respectively overlapping the associated member 52 and the plate 46 and is secured thereto by weldments. Finally, the nuts 54 are turned on the members 52 to effectively connect the cross bracing to the legs 10.

It will be noted that the opposite end panels 14 of the tray and the several bottom boards 18 thereof coact to space the opposite side legs 10 a predetermined distance apart. Similarly, the opposite side panels 12 of the tray and the members 22 thereof coact to space the opposite end legs 10 a predetermined distance apart. Each member 22, in addition, provides a seat for corresponding end portions of the several bottom boards 18. Each cross-brace of the pair thereof ties a pair of diagonally disposed legs 10 together and functions to preserve the rectangular shape of the tray. In addition, the cross bracing helps to keep the bottom boards 18 from sagging under load.

It should also be noted that, if desired, the depth of the tray may be readily increased by extending the leg braces 24 a suitable distance above the opposite end panels 12 and opposite end panels 14 and securing auxiliary side and end panels to the extensions.

It will be appreciated that a plurality of wooden trays with legs braced and tied together by cross bracing in accordance with the invention may be readily stacked one upon another, as required. It will also be appreciated that trays with legs braced and tied together by cross bracing in accordance with the invention will be better able to withstand the weight of stacking and the strain of being transported by fork-lifts and conveyor belts and/or rollers from one area to another.

While, in accordance with the provisions of the patent statutes, I have illustrated and described the best embodiment for the practice of my invention now known to me, it will be apparent to those skilled in the art that changes may be made without departing from the scope of the invention as set forth in the appended claims.

What is claimed is:

1. A tray for compost used in the cultivation of mushrooms, comprising:
   A. four upright legs rectangular in transverse section,
   B. a pair of opposed side panels and a pair of opposed end panels extending about said legs to cojointly define a rectangular enclosure,
   C. a bottom for said enclosure disposed a substantial distance above the lower extremities of said legs, said bottom including a plurality of laterally spaced members, each of which is connected to said panels to provide support for the compost in said tray, the spaces between adjacent ones of said members providing slots adapted for exposing the base of the compost in said tray ambient conditions,
   D. a leg brace of L-shape in transverse section at each corner of the tray, said leg brace operatively overlying respectively the outwardly facing surfaces of the leg and being of a length substantially corresponding to that of the leg, an upper section of the leg brace being disposed in close overlying relation to the ends of the associated side and end panels, and a lower section of the leg brace being disposed in spaced relation to the associated leg,
   E. means interposed between said lower section and the leg brace and said leg for enabling said lower section of the leg brace to be operatively drawn tight against said leg, and
   F. cross bracing disposed in close overlying relation to the bottom of said tray, each end of said cross bracing extending diagonally through one of said legs and the associated one of the leg braces for connection thereto.

2. A tray according to claim 1 wherein the cross bracing is disposed within the tray.

3. A tray according to claim 2 wherein the cross bracing is anchored to the bottom of the tray, at the center thereof.

4. A tray according to claim 3 wherein the cross bracing comprises a plate anchored to the bottom of the tray, at the center thereof, four rods connected to said center plate and extending outwardly therefrom in angularly spaced relation, the free ends of said rods being each projected diagonally through the associated leg of said tray and the brace therefor, and said free ends of the rods having nuts threaded thereon and abutting the heels of said leg braces.

5. A tray for compost used in the cultivation of mushrooms, comprising:
   A. four laterally spaced upright legs rectangular in transverse section,
   B. a pair of opposed side panels and a pair of opposed end panels connected to said legs and forming a rectangular enclosure,
   C. a bottom for said enclosure disposed a substantial distance above the lower extremities of said legs, said bottom including a plurality of laterally spaced members spanning a pair of said panels and having opposite end portions of each connected respectively to the downwardly facing narrow edges of said panels,
   D. a pair of members each underlying corresponding ends of said bottom members and extending between the associated legs of said tray for supporting said bottom members,
   E. four leg braces of L-shape in transverse section, the upper section of each leg brace overlying the associated side and end panels, the lower section of the leg brace being disposed in spaced relation to the associated leg,
   F. members interposed between said lower section of the leg brace and said leg to operatively bring the surface of said leg outwardly flush with the outer surfaces of the associated panels, and
   G. cross bracing disposed within the tray in close overlying relation to the bottom thereof, and said cross bracing comprising a plate anchored to the bottom of said tray, at the center thereof, four rods connected to said center plate and extending outwardly therefrom in angularly spaced relation, the free ends of said rods being each projected diagonally through the associated leg of said tray and the brace therefor, and said free ends of the rods having nuts threaded thereon and abutting the heels of said leg braces.

* * * * *

UNITED STATES PATENT AND TRADEMARK OFFICE
CERTIFICATE OF CORRECTION

PATENT NO. : 3,992,808
DATED : NOVEMBER 23, 1976
INVENTOR(S) : PAUL G. STENGEL

It is certified that error appears in the above-identified patent and that said Letters Patent are hereby corrected as shown below:

Column 1, line 27 should read as follows:
--at high temperatures, the root system is germinated--.

COLUMN 3, last line, after "tray" and before "ambient" insert --to--.

COLUMN 4, line 10 should read as follows:
--E. means interposed between said lower section of--.

Signed and Sealed this

Twenty-first Day of June 1977

[SEAL]

Attest:

RUTH C. MASON
Attesting Officer

C. MARSHALL DANN
Commissioner of Patents and Trademarks